United States Patent [19]

Johnson et al.

[11] Patent Number: 4,836,100

[45] Date of Patent: Jun. 6, 1989

[54] APPARATUS FOR REGULATING FEED THICKNESS IN A BELT PRESS

[75] Inventors: Harold W. Johnson, Kingwood; James M. Mastel, Spring; Alan L. Scott, Kingwood, all of Tex.

[73] Assignee: Ashbrook-Simon-Hartley Corporation, Houston, Tex.

[21] Appl. No.: 121,715

[22] Filed: Nov. 17, 1987

[51] Int. Cl.[4] .......................... B30B 9/24; B01D 33/00

[52] U.S. Cl. .................................... 100/118; 100/151; 210/386; 210/400

[58] Field of Search ............... 100/118, 119, 120, 151, 100/152, 153, 154, 191, 192, 258 A; 210/386, 400, 456, 396; 99/495, 496

[56] References Cited

U.S. PATENT DOCUMENTS

| | | | |
|---|---|---|---|
| Re. 3,984,329 | 10/1986 | Wenzel et al. | 210/396 |
| 931,728 | 8/1909 | Bretz | 100/154 X |
| 4,142,971 | 3/1979 | LeFur et al. | 210/386 X |
| 4,153,550 | 5/1979 | Lautrette | 100/151 X |
| 4,265,171 | 5/1981 | Busse et al. | 100/151 X |
| 4,336,096 | 6/1982 | Dedekind | 100/154 X |
| 4,647,417 | 3/1987 | Bottger et al. | 100/154 X |
| 4,676,902 | 6/1987 | Fayoux et al. | 210/400 X |

FOREIGN PATENT DOCUMENTS

| | | | |
|---|---|---|---|
| 2105575 | 8/1972 | Fed. Rep. of Germany | 100/154 |
| 58-128298 | 7/1983 | Japan | 100/118 |

*Primary Examiner*—Philip R. Coe
*Assistant Examiner*—Stephen F. Gerrity
*Attorney, Agent, or Firm*—Foley & Lardner, Schwartz, Jeffery, Schwaab, Mack, Blumenthal & Evans

[57] ABSTRACT

A squeeze plate apparatus for a belt press is provided. The apparatus has a squeeze plate operatively connected to a rotating pipe. The pipe is mounted to the frame of the belt press. The vertical spacing between the squeeze plate and the pipe varies during rotation of the pipe so that the squeezing action of the plate can be selectively varied.

12 Claims, 6 Drawing Sheets

APPARATUS FOR REGULATING FEED THICKNESS IN A BELT PRESS

BACKGROUND OF THE INVENTION

The invention relates to an apparatus for regulating the feed thickness of feed material which is fed into a belt press machine.

Belt press machines are used in a variety of applications, including processing sludges and separating juice and pulp from fruit. The machine is basically operated on the principle of pressing feed material such as sludge or fruit between two moving belts. The pressing is accomplished by moving the belts over a series of rollers and sequentially narrowing the spacing between the belts so as to press the feed material therebetween. During the pressing operation, water or juice is forced outward through the belts or beyond their edges and is collected by suitable means. At the end of the pressing operation, the partially de-watered feed material is expelled from the belts.

The pair of belts used for the pressing operation are each moved over separate drive and idler rollers in an endless loop. Typically, feed material is deposited on one of the belts at a section where the belt is horizontally aligned and the deposited feed material is moved along by the one belt and brought into contact with the opposing belt. In one known belt press, described in U.S. Pat. No. 3,984,329 to Wenzel, the feed material is brought into contact with the opposing belt at a section where both belts are sharply vertically inclined. In this belt press, the feed material is initially squeezed between the belts as it slides downward between the vertically inclined section of the belt in a chute-like manner. In another known belt press, the feed material is brought into contact with the opposing belt at a section of the belt press where the two opposing belts are approximately horizontal It is advantageous to have the thickness of the feed material as uniform as possible during the time that the feed material is initially pressed between the opposing belts. Differences in the rate of travel of each belt can arise when feed material of varying thickness is initially pressed. This differential rate of travel of the two belts leads to such undesirable consequences as one of the belts folding on itself, thereby necessitating shutdown of the belt press operation to unfold the belt.

To ensure that the thickness of the feed material is as uniform as possible, a squeeze plate apparatus has been used to squeeze the incoming feed material immediately before it is pressed between the opposing belts. The squeeze plate apparatus has a smooth surface plate having a width at least equal to the width of the cake which is almost as wide as the belt. The plate is mountable between or around the belts at the section of the belt press where the feed material is first being brought into contact with the second opposing belt by the first opposing belt. The squeeze plate squeezes the material against one of the belts so as to reduce the feed material to a generally uniform thickness before it is squeezed by the two opposing belts. The squeeze plate is adjustable in a direction transverse to the direction of movement of the feed material so that it can be spaced from the associated belt at various distances, depending upon the desired degree of squeezing of the feed material which is desired.

In one known squeeze plate apparatus, the squeeze plate is suspended above the underlying belt by a number of bolts spaced around the periphery of the squeeze plate. To adjust the squeeze plate, each bolt must be appropriately rotated. If careful attention is not paid during the rotation of the individual bolts, the surface of the squeeze plate will not be parallel to the underlying belt, resulting in feed material of varying thickness as the feed material passes beyond the squeeze plate.

It would be advantageous to have a squeeze plate apparatus which can be easily and rapidly adjusted to vary the degree of squeezing action. Furthermore, it would be advantageous to have a squeeze plate apparatus which can be adjusted from one side of the belt press. Also, it would be advantageous to have a squeeze plate apparatus which can be adjusted without interrupting the operation of the belt press. A further advantage would be an improved squeeze plate apparatus which can be easily adjusted to several positions while ensuring that at each position the smooth surface of the plate is uniformly spaced from the underlying belt.

SUMMARY OF THE INVENTION

It is therefore an object of the invention to provide a squeeze plate apparatus which is easily adjustable to a plurality of positions.

It is also an object of the invention to provide a squeeze plate apparatus in which the squeeze plate can be reliably adjusted to positions at which it is uniformly spaced from an underlying belt of a belt press.

It is a further object of the invention to provide a squeeze plate apparatus which can be operated from one side of the belt press.

It is a further object of the invention to provide a squeeze plate apparatus which can be manually adjusted.

It is yet another object of the invention to provide a belt press equipped with an easily adjustable squeeze plate apparatus.

In accomplishing the foregoing objects, there has been provided according to the present invention, an apparatus for regulating the thickness of feed material which is fed between two belts of a belt press, comprising a squeeze plate for squeezing the feed material against an associated one of the belts; and means for adjustably supporting the squeeze plate between the belts, comprising a first pair of mounting brackets, each mounting bracket being adapted to be connected to the belt press on a respective opposite side of the squeeze plate; means for movably connecting the squeeze plate to the first pair of mounting brackets; a second pair of mounting brackets, each mounting bracket being adapted to be connected to the belt press on respective opposite side of the squeeze plate; a tube rotatably supported by the second pair of brackets and extending along the squeeze plate; an element interconnecting the tube and the squeeze plate, the element, the tube and the squeeze plate cooperating together so that the vertical spacing between the squeeze plate and the tube varies during rotation of the tube.

According to another aspect of the present invention, there has been provided a belt press for pressing fluid or other materials from a feed material, comprising a pair of belts for squeezing the feed material therebetween; a squeeze plate for squeezing the feed material against an associated one of the belts; and means for adjustably supporting the squeeze plate between the belts, comprising: a first pair of mounting brackets adapted to be connected to the belt press on a respective opposite side of the squeeze plate; means for movably connecting the squeeze plate to the first pair of mounting brackets; a second pair of mounting brackets, each mounting bracket being adapted to be connected to the belt press on a respective opposite side of the squeeze plate; a tube rotatably supported by the second pair of brackets and extending along the squeeze plate; an element interconnecting the tube and the squeeze plate, the element, the tube and the squeeze plate cooperating together so that the vertical spacing between the squeeze plate and the tube varies during rotation of the tube.

Further objects, features and advantages of the present invention will become apparent from the detailed description of preferred embodiments which follows, when considered together with the attached figures of drawings.

DETAILED DESCRIPTION OF THE PREFERRED EMBODIMENTS

Figure 1:
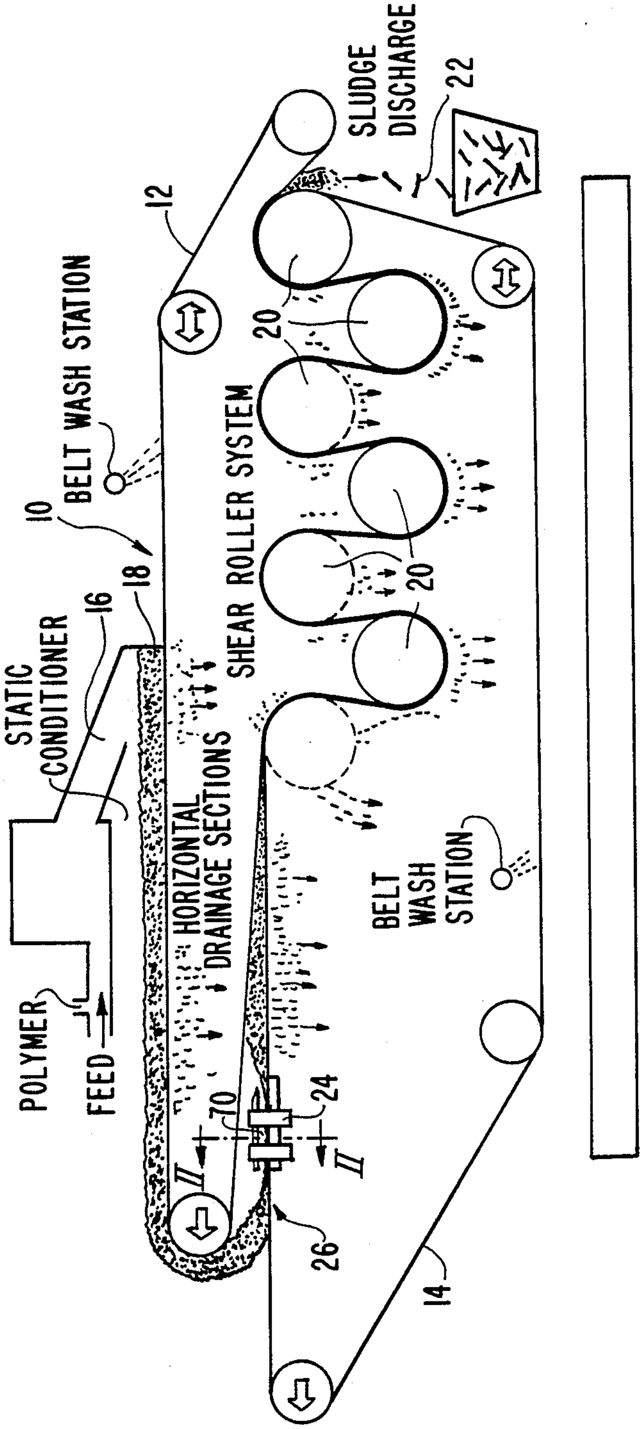
FIG. 1 is a schematic representation of a belt press machine of the horizontal press type, having a squeeze plate apparatus of the present invention.
Figure 2:
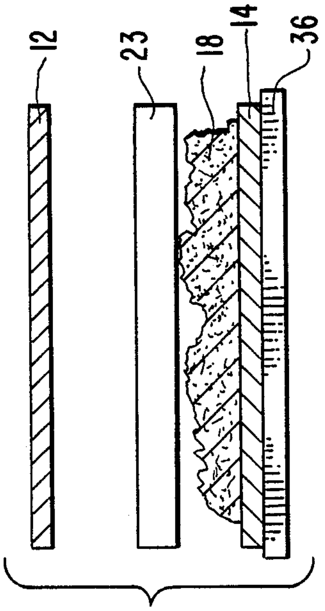
FIG. 2 is a cross sectional view of the belts of the belt press of FIG. 1 and the squeeze plate apparatus of the present invention, taken along lines II—II.
Figure 4:
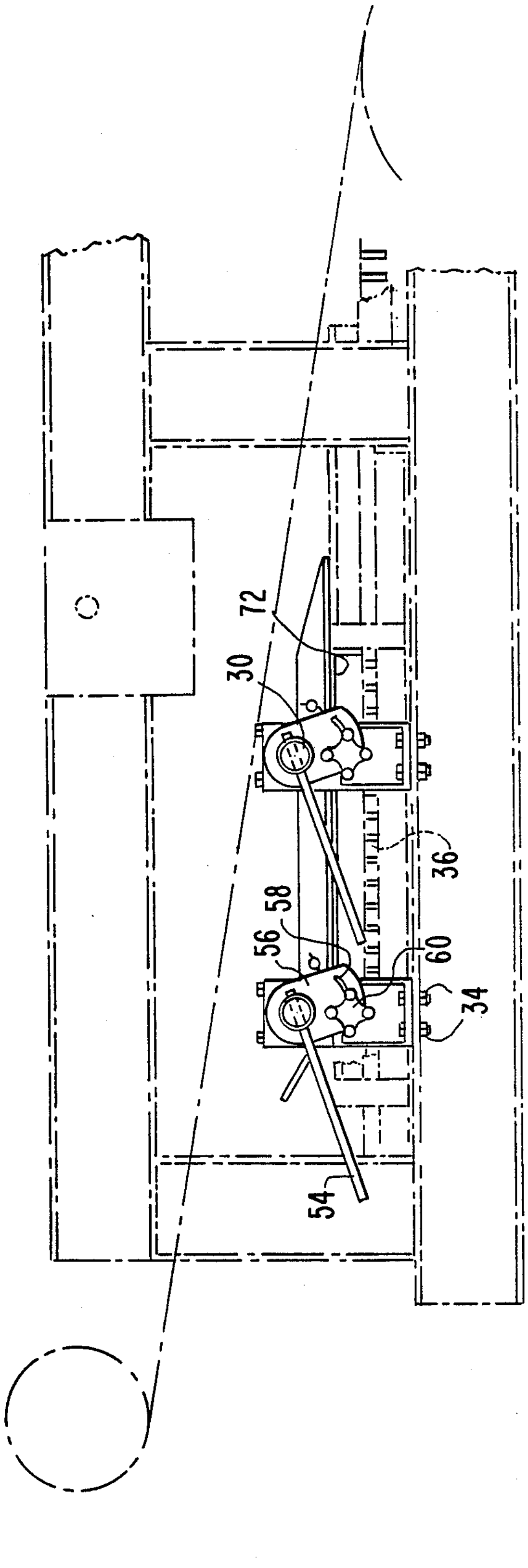
FIG. 4 is an enlarged side plan view of the squeeze plate apparatus of FIG. 1.
Figure 3:
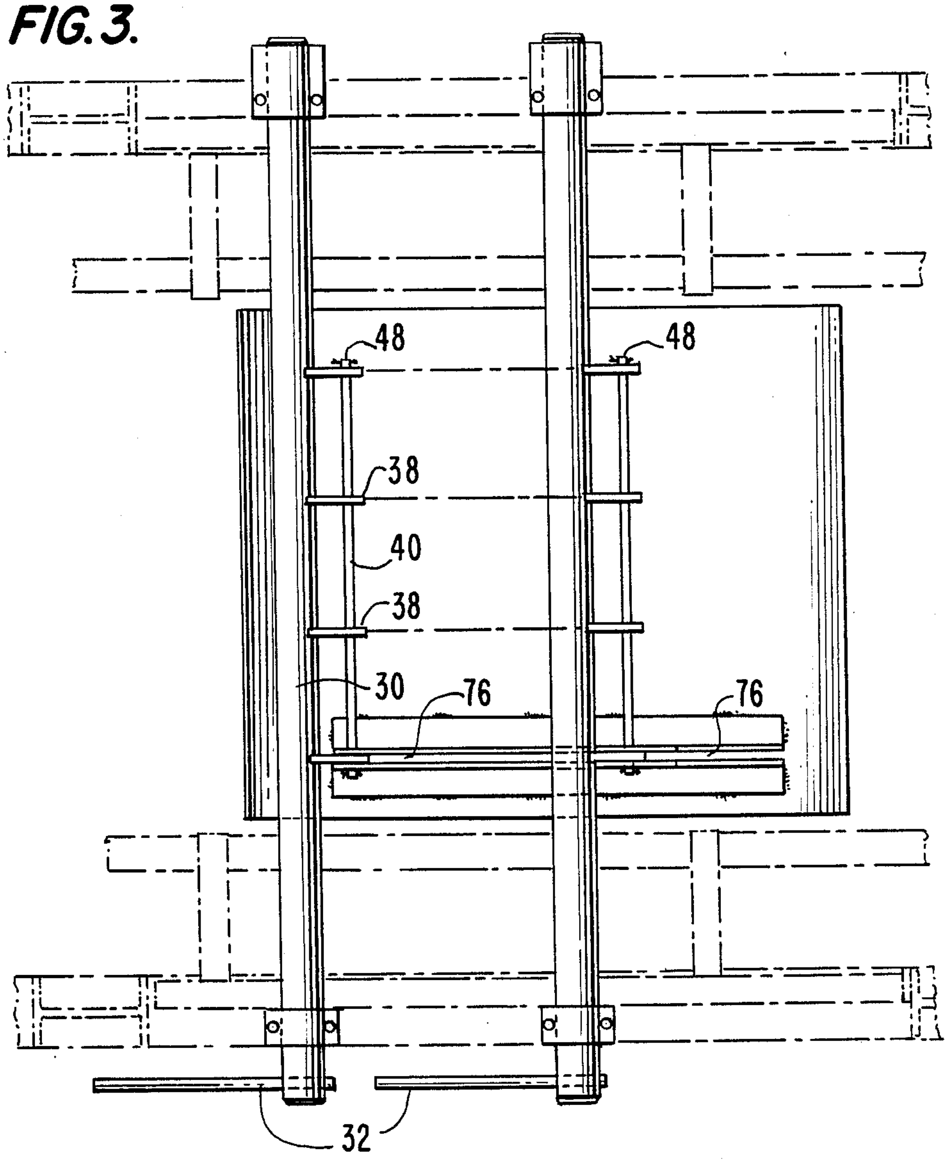
FIG. 3 is an enlarged top plan view of the squeeze plate apparatus of the present invention in FIG. 1.
Figure 6:
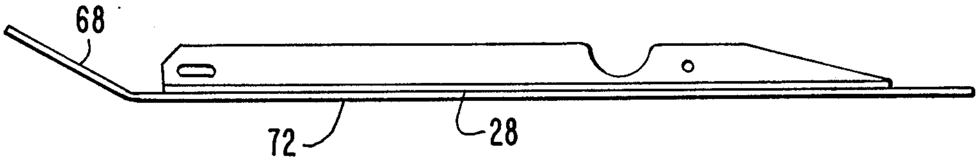
FIG. 6 is a side plan view of the plate in FIG. 5.
Figure 5:
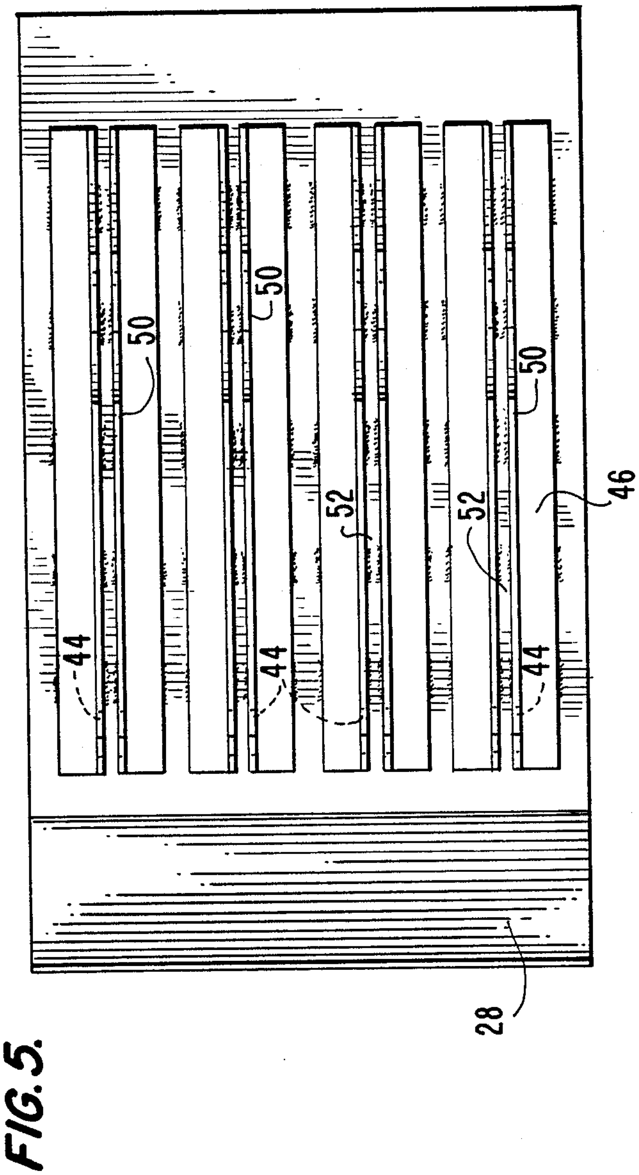
FIG. 5 is an enlarged top plan view of the plate of the squeeze plate apparatus in FIG. 1.
Figure 7:
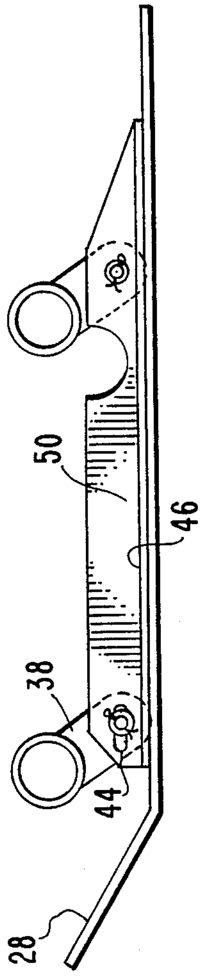
FIG. 7 is a side plan view of the plate in FIG. 6, shown with the adjustment element of the present invention.
Figure 8:
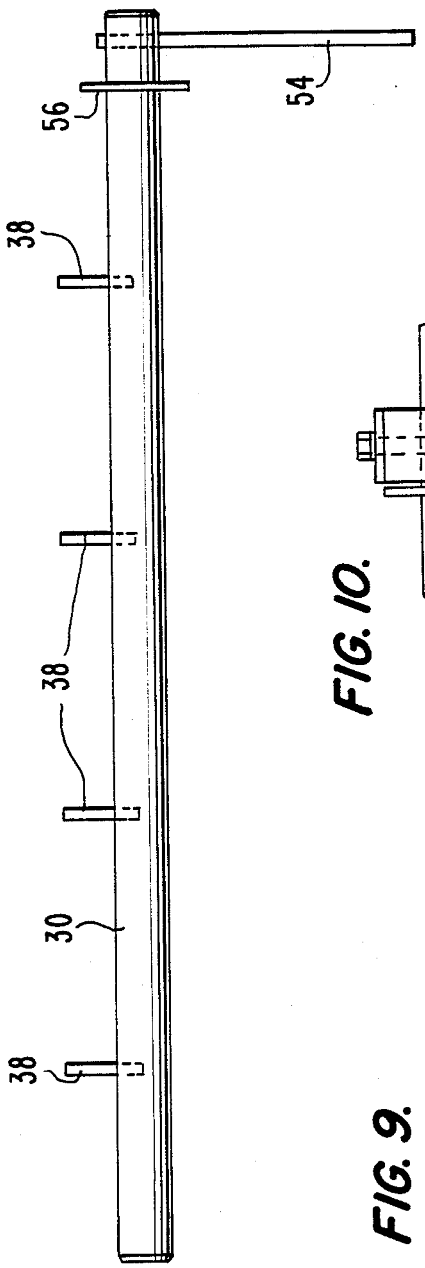
FIG. 8 is an enlarged top plan view of the adjustment element of the squeeze apparatus in FIG. 1.

Referring generally to FIG. 1, a belt press 10 is schematically shown having a pair of endless loop pressing belts 12 and 14 and a feed device 16 for feeding feed material 18 onto belt 12. Belts 12, 14 are moved over a series of rollers 20 so as to squeeze liquid or other material from feed material 18. The de-watered feed material 18 is expelled after passage through the roller section as cakes 22.

The squeeze plate apparatus 24 of the present invention is disposed within the initial pressing section 26 of belt press 10. Squeeze plate apparatus 24 is operated to regulate the thickness of feed material 18 immediately before feed material 18 is pressed between belts 12, 14.

With reference to FIGS. 2-5, squeeze plate apparatus 24 generally comprises a plate 28 which is movably suspended by a pair of tubes 30. Each tube 30 is rotatably supported by a pair of spaced brackets 32. Brackets 32 are adapted to be mounted on the frame of belt press 10 by bolts 34. Brackets 32 also support a support grid 36 which is adapted to support belt 14 as it moves under plate 28.

Tubes 30 each have a number of cam projections 38 fixed to their periphery. A rod 40 passes through holes 42 near the free end of each cam projection 38 and also passes through slots 44 of flanges 46 attached to the top of plate 28. Pins 48 prevent rod 40 from sliding out of holes 42 and 44. When the associated lever 32 is rotated, projection cams 38 act through rod 40 to raise or lower plate 28.

Flanges 46 are mounted across the top surface of plate 28 and have vertical sides 50 which are each arranged in spaced, opposing relationship to sides 50 of other flanges 46. A gap 52 between each pair of opposing sides 50 is sufficiently wide to accommodate the free end of each projection cam 38 for nonbinding movement therein. Also, flanges 46 are each provided with a recess 76 for receiving one of the tubes 30 when plate 28 is raised relative to belt 14. This allows a greater range of sparing between plate 28 and belt 14.

Figure 10:
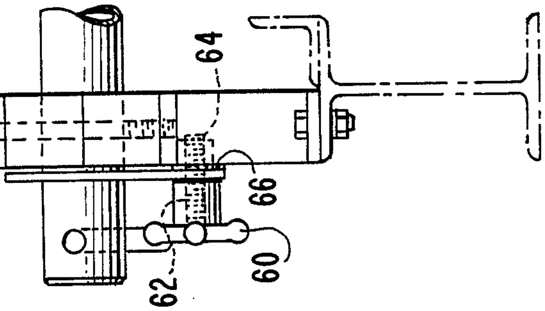
FIG. 10 is an enlarged front plan view of the adjustment knob of the squeeze plate apparatus in FIG. 1.
Figure 9:
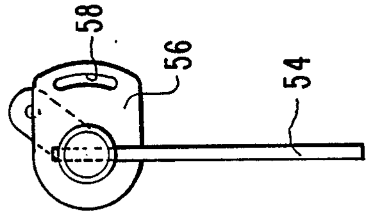
FIG. 9 is an enlarged front plan view of the lever of the adjustment element in FIG. 8.

Each tube 30 is provided with a lever 54 by which an operator can apply a leveraged force to rotate the tube. Also, the portion of each tube beyond one mounting bracket 32 has a locking collar 56 fixedly mounted thereon. Locking collar 56 has a arcuate slot 58. As shown in FIG. 10 in particular, a locking hand knob 60 is provided with an inner axially threaded section 62 for receiving a threaded bolt 64 extending from bracket 32 and outward through slot 58 of locking collar 56. Locking hand knob 60 can be threaded along bolt 64 to compress a pair of washers 66 against either side of locking collar 56. This locking arrangement permits an operator to lock tube 30 at any one of a number of selected positions of rotation.

Plate 28 comprises an upwardly angled tail section 68 which is adapted to face the incoming feed material 18 when the squeeze plate apparatus is positioned between the belts. Tail section 68 pushes the incoming feed material 18 gradually downward toward the vertical gap 70 (see FIG. 1) defined between plate 28 and the underlying belt 14.

As feed material 18 moves along vertical gap 70, larger portions of the feed material are pushed down or broken apart through contact with the solid surface 72 of plate 28. This process helps to ensure that the feed material 18 exiting from gap 70 does not comprise any large pieces which could become wedged between opposing belts 12, 14 as the belts travel, thereby leading to the undesirable folding problem noted above.

Figure 11:
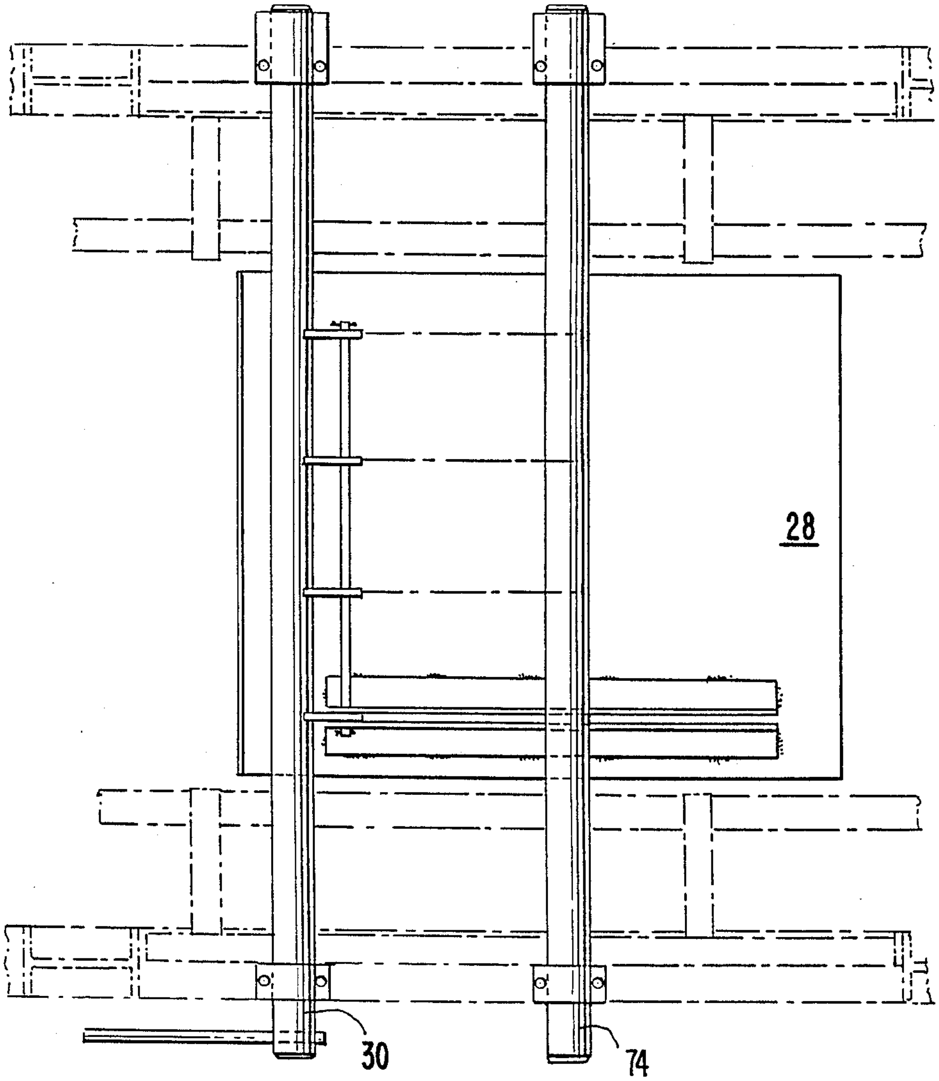
FIG. 11 is an enlarged top plan view of another embodiment of a squeeze plate apparatus according to the present invention.

FIG. 11 shows another embodiment of squeeze plate apparatus 24 having a single tube 30 for supporting one end, of plate 28 and a swivel mounting means 74 for supporting the other end of plate 28. In this embodiment, tube 30 is rotated to adjust the vertical spacing between plate 28 and the underlying belt 14 while plate 28 swivels by means of swivel mounting means 74.

What is claimed is:

1. An apparatus for regulating the thickness of feed material which is fed between two moving belts of a belt press, comprising:

a squeeze plate for squeezing the feed material against one of the belts; and means for adjustably supporting the squeeze plate between the belts, said supporting means comprising:

a tube positioned between the belts in an orientation transverse to the direction of movement of the belts, the tube supporting the squeeze plate above the belt carrying the feed material;

means for rotating the tube about its longitudinal axis;

means interconnecting the tube and the squeeze plate, for varying the distance of the squeeze plate above the belt carrying the feed material in response to the rotation of the tube; and means for locking the tube in a rotational position corresponding to a desired height of the squeeze plate above the feed carrying belt.

2. The apparatus of claim 1, wherein the interconnecting means includes at least one cam fixed to, and rotatable with, the tube, the cam contacting the squeeze plate.

3. The apparatus of claim 1, wherein the tube is supported by a pair of mounting brackets, one bracket being positioned on each side of the feed carrying belt.

4. The apparatus of claim 1, wherein the squeeze plate includes a section formed at an angle away from the feed carrying belt, the section being pointed toward the direction of incoming feed material for gradually guiding the feed material downward toward the feed carrying belt.

5. The apparatus of claim 1, wherein the rotatable means is a lever mounted on the tube and extending radially therefrom.

6. The apparatus of claim 1, wherein the interconnecting means includes a plurality of elements fixed to, and rotatable with, the tube.

7. The apparatus of claim 6, wherein flanges are positioned on the squeeze plate, each interconnecting means cooperating with an associated flange to vary the distance of the squeeze plate above the feed carrying belt.

8. An apparatus for regulating the thickness of feed material fed between two moving belts of a belt press, comprising:

a squeeze plate for squeezing the feed material against one of the belts;

and means for adjustably supporting the squeeze plate between the belts, said supporting means comprising;

first and second tubes positioned between the belts, each tube being oriented transversely to the direction of movement of the belts, the tubes cooperatively supporting the squeeze plate above the feed carrying belt;

means for independently rotating each tube about its longitudinal axis;

means interconnecting each tube and the squeeze plate for varying the distance of the squeeze plate above the feed carrying belt in response to the rotation of either or both tubes; and means for locking each tube in a rotational position corresponding to a desired distance between the squeeze plate and the belt.

9. The apparatus of claim 8, wherein the interconnecting means are cams fixed to, and rotatable with, each tube, each cam being in contact with the squeeze plate.

10. The apparatus of claim 8, wherein each tube is supported by a pair of mounting brackets, one bracket of each pair being positioned on each side of the feed carrying belt.

11. The apparatus of claim 8, wherein the rotatable means is a lever, one lever mounted on each said tube and extending radially therefrom.

12. The apparatus of claim 8, wherein flanges are mounted on said squeeze plate, each interconnecting means cooperating with an associated flange to vary the distance of the squeeze plate above the feed carrying belt.

* * * * *